(12) United States Patent
Pickel et al.

(10) Patent No.: US 6,354,427 B1
(45) Date of Patent: Mar. 12, 2002

(54) DEVICE FOR INTRODUCING CONTAINERS INTO A TREATMENT SPACE AND/OR REMOVING THEM THEREFROM

(75) Inventors: Herbert Pickel, Neutraubling; Heinz Humele, Thalmassing, both of (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 09/286,696

(22) Filed: Apr. 6, 1999

(30) Foreign Application Priority Data

Apr. 11, 1998 (DE) .......................................... 198 16 239

(51) Int. Cl.[7] ........................ B65G 25/00; B65G 29/00; B65G 37/00; B65G 47/84; B65G 47/86
(52) U.S. Cl. ................................ 198/470.1; 198/475.1; 198/803.3
(58) Field of Search .......................... 198/469.1, 470.1, 198/475.1, 803.3, 803.9

(56) References Cited

U.S. PATENT DOCUMENTS

| | | | |
|---|---|---|---|
| 1,766,018 A | | 6/1930 | Flook |
| 2,660,513 A | | 11/1953 | Ball |
| 3,710,928 A | * | 1/1973 | van Zip ............. 198/470.01 X |
| 4,512,456 A | * | 4/1985 | Peyton .................... 198/479 X |
| 4,651,879 A | * | 3/1987 | Harris et al. .......... 198/803.7 X |
| 4,938,337 A | * | 7/1990 | Jowitt et al. .......... 198/470.1 X |
| 5,457,939 A | | 10/1995 | Bardou et al. |
| 5,607,045 A | * | 3/1997 | Kronseder ........... 198/479.1 X |
| 5,711,411 A | * | 1/1998 | Zurweller ............ 198/470.1 X |
| 6,079,541 A | * | 6/2000 | Bercelli et al. ...... 198/470.1 X |

* cited by examiner

Primary Examiner—Christopher P. Ellis
Assistant Examiner—Gene O. Crawford
(74) Attorney, Agent, or Firm—Marshall, Gerstein & Borun

(57) ABSTRACT

A device for introducing containers into a treatment space and for removing the containers from said treatment space having at least one rotatable sluice wheel provided on the periphery with sluice chambers that are open toward the outside, the sluice wheel being provided with grippers that can be operated directly by the containers or indirectly by a control device, for securing the containers temporarily in the sluice chambers, preferably by suspending the containers without allowing them to come in contact with the chamber walls and without providing any bottom support. A trouble-free conveyance of the containers with a very high output is possible without damaging the containers, even when the containers are very susceptible to tilting.

23 Claims, 3 Drawing Sheets

DEVICE FOR INTRODUCING CONTAINERS INTO A TREATMENT SPACE AND/OR REMOVING THEM THEREFROM

FIELD OF THE INVENTION

The present invention concerns a device for introducing containers into, and removing them from, a treatment space, such as in a beverage bottling operation.

BACKGROUND OF THE INVENTION

Such devices are known in various embodiments, where the containers are inserted into the sluice wheel or removed from it by rotating star wheels in combination with stationary guide rails (U.S. Pat. No. 5,457,939), by swivel arms with stationary swivel axes (U.S. Pat. No. 2,660,513) or by controlled radial slides mounted in the sluice wheel in combination with stationary guide rails (U.S. Pat. No. 1,766, 018). With the known devices, the containers stand with their bottom surfaces on corresponding supporting surfaces of the chambers during conveyance in the sluice wheel, and are otherwise freely movable in the chambers. Therefore, their positions can easily change under the influence of the force of gravity plus optionally the supply and removal of gas acting on the chambers. This leads to problems in removing the containers, from the chambers, can cause damage to the containers and is possible only if the containers are sufficiently stable. Furthermore, a high efficiency in conveyance is impossible.

SUMMARY OF THE INVENTION

The object of this invention is to significantly improve the conveyance efficiency and operating reliability of a generic device with simple means even in handling containers with a low stability, and to reliably suppress damage to the containers.

With a device according to this invention, a reliable centering and stabilization of the containers in the sluice wheel is made possible through the grips arranged in the sluice chambers. Tilting of the containers, damage due to striking the chamber walls, or faulty transfer to downstream conveyance devices are reliably prevented and a very efficiency conveyance is made possible.

Various designs are possible for the grips in the sluice chambers. An especially simple design with reliable fixation of the containers is made possible by the invention. Other embodiments of this invention permit reliable conveyance at a high speed even when handling especially lightweight and unstable containers such as PET bottles. It is especially expedient if the conveyor elements that work together with the sluice wheel are provided with clamps for stable holding of the containers, so that even at the highest processing rates, it is reliably possible to introduce the containers into the sluice wheel and/or remove them from it.

BRIEF DESCRIPTION OF THE DRAWINGS

One embodiment of this invention is described below on the basis of the figures, which show.

DETAILED DESCRIPTION OF THE INVENTION

Figure 1:
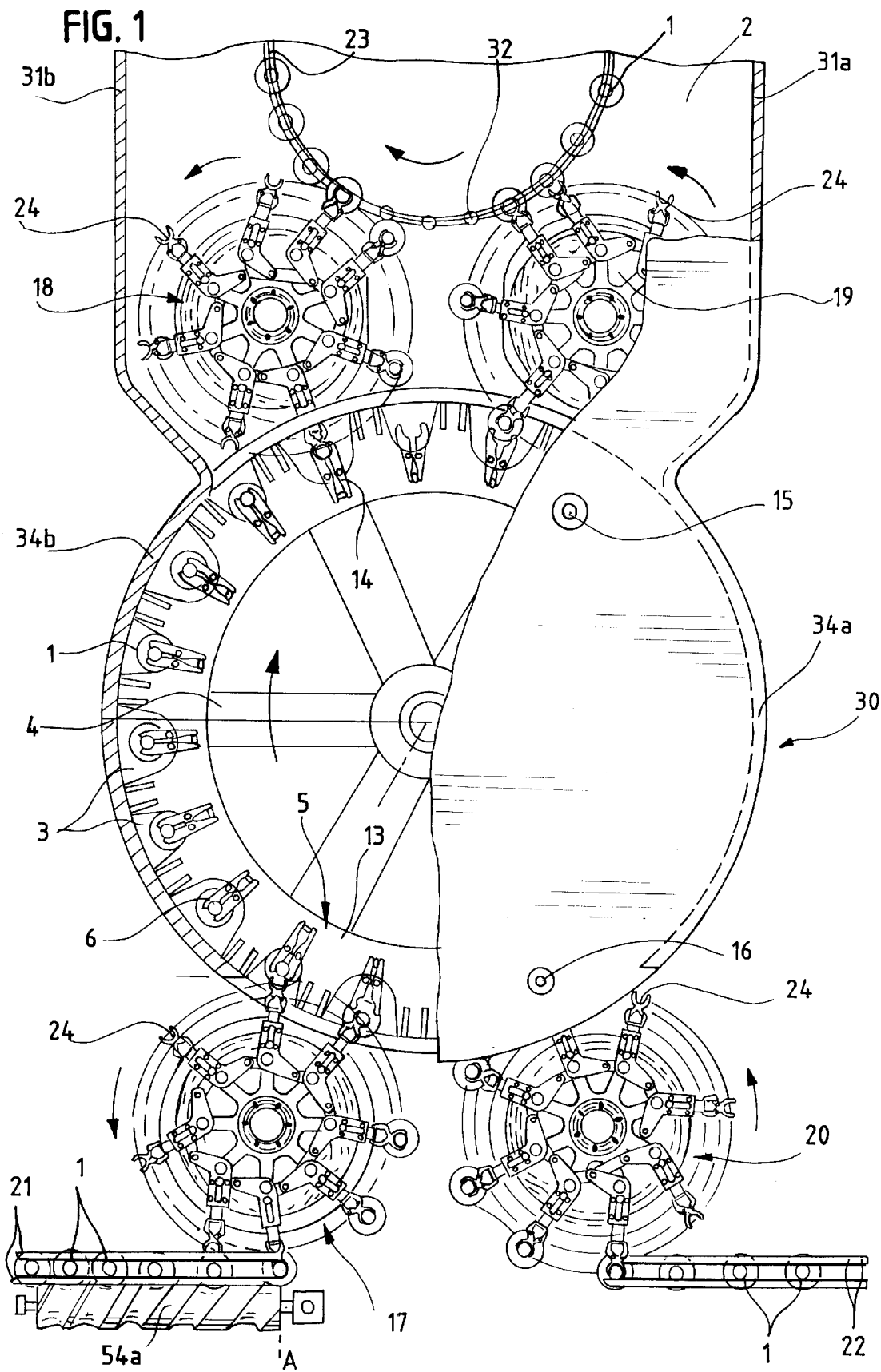
FIG. 1 a top view of a device for introducing bottles into a treatment space and removing them from the treatment space, partially in the form of sectional diagrams.
Figure 2:
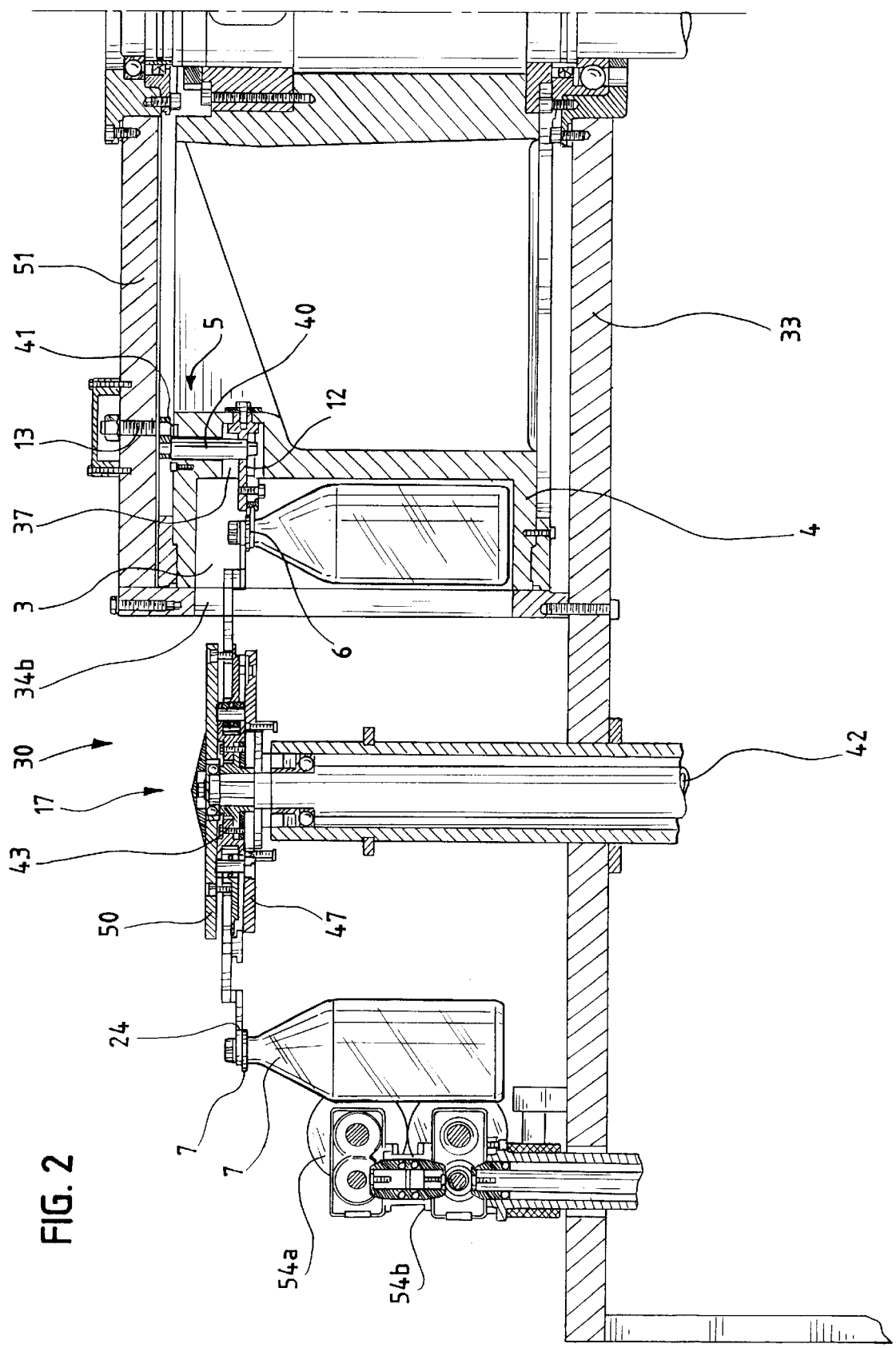
FIG. 2 section A–B according to FIG. 1.
Figure 3:
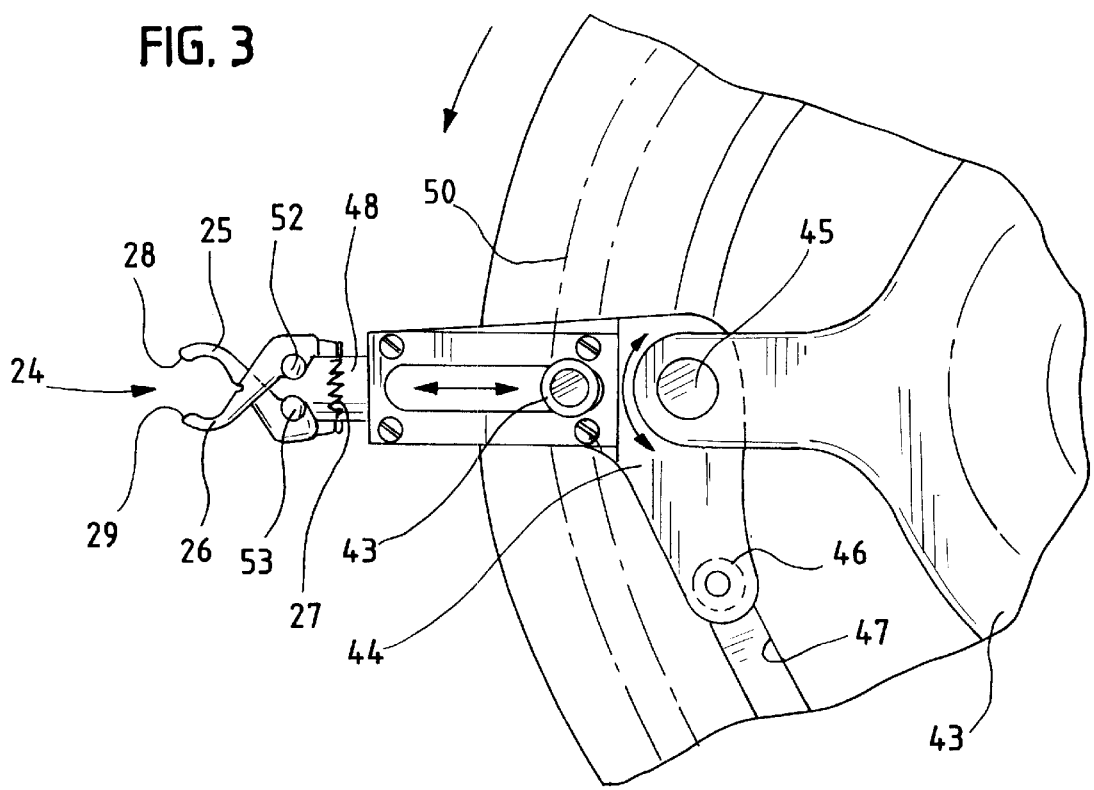
FIG. 3 an enlarged top view of a single clamp of a star wheel.

The device according to FIGS. 1 through 4, labeled as 30 on the whole, is designed for introducing containers in the form of PET bottles, hereinafter referred to simply as bottles 1, into a treatment space 2 which is under a high vacuum, and then removing the containers from said treatment space, where said bottles 1 are coated to increase the barrier properties. The treatment space 2 is hermetically sealed from the environment by walls 31 and it has a continuously revolving conveyor 23 with mandrels 32 that can be inserted into the opening in the bottles 1 and advances the bottles 1 to the coating facilities (not shown).

The device 30 has a horizontal base plate 33 on whose top side are mounted a central sluice wheel 4 and a total of four star wheels 17, 18, 19, 20, each with a perpendicular axis of rotation that work together with the sluice wheel 4. The sluice wheel 4 and the star wheels 17 through 20 are driven continuously in the direction of the arrow by drive elements (not shown) arranged beneath the base plate 33 in synchronization with one another and in synchronization with conveyor 23, so that they mesh with one another essentially in the manner of gearwheels.

The sluice wheel 4 is equipped on the periphery with sluice chambers 3 that are open only radially toward the outside but are otherwise closed airtight; the height, depth and width of these sluice chambers is slightly greater than the largest bottle 1 to be processed. The surfaces of the sluice wheel 4 facing radially outward and bordering the sluice chambers 3 lie in a cylindrical surface arranged concentric with its axis of rotation and work together with suitably cylindrically curved sluice walls 34a and 34b, which develop into walls 31a and 31b of treatment space 2 in an airtight manner. A rotating sluice is formed by the sluice wheel 4 and the sluice walls 34a, 34b which are rigidly connected to the base plate 33 at the bottom and to a cover plate 51 at the top, with the sluice chambers being open toward the treatment space 2 in the area adjacent to said treatment space, and being open toward the environment on the opposite peripheral area, while also being separated from the treatment space 2 as well as the environment in the two peripheral areas in between. The sealing function can be improved by means of gaskets (not shown) between the sluice wheel 4 and the sluice walls 34a, 34b. In addition, the sluice chambers 3 can be connected to lines for supplying and/or removing gas in the area of the sluice walls 34a, 34b.

Each sluice chamber 3 has its own gripper 6 with which the bottles 1 are centered and secured during their conveyance with the sluice wheel 4, namely by suspension without any bottom support and without coming in contact with the walls of the sluice chambers 3. Each gripper 6 has two essentially parallel swiveling levers 8, 9 arranged in the manner of gripper tongs in the horizontal plane of rotation of the sluice wheel 4 and essentially radially to its axis of rotation. The two swiveling levers 8, 9 are mounted pivotally on a common supporting plate 12 by means of bearing pins 35, 36. The supporting plate 12 is in turn mounted detachably by means of a screw in a horizontal radial alignment in a recess 37 in the respective sluice chamber 3, providing an airtight seal.

Figure 4:
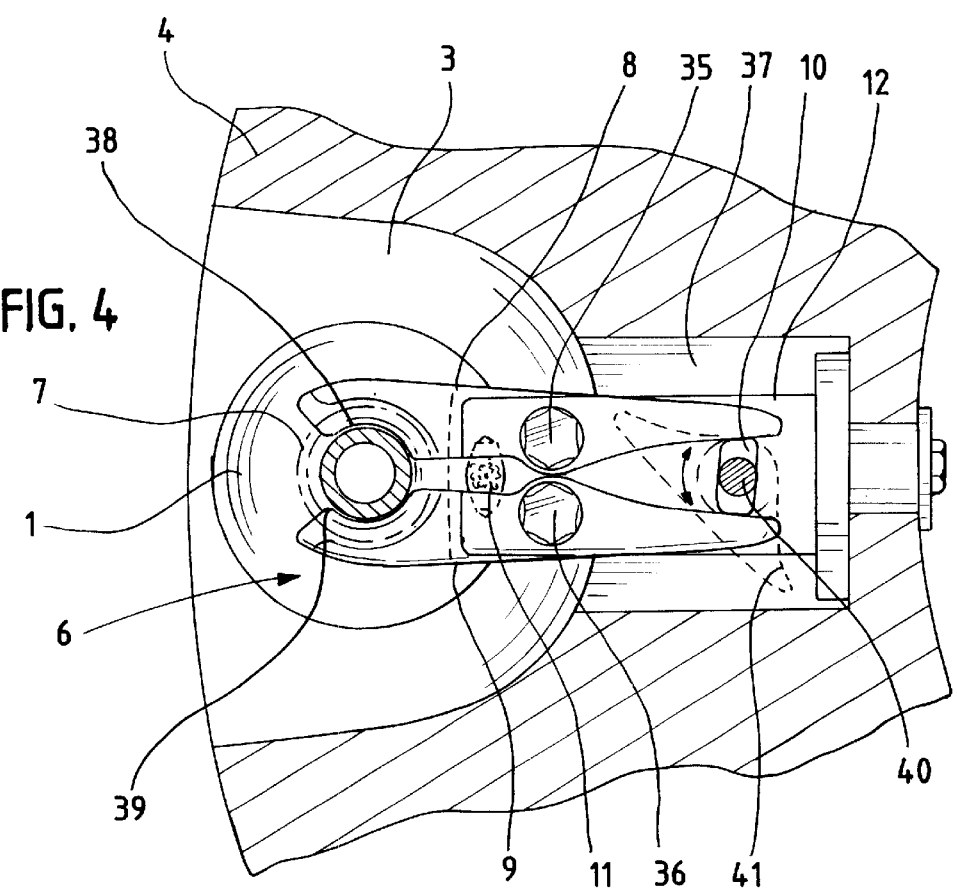
FIG. 4 an enlarged top view of a gripper of the sluice wheel.

As shown in particular in FIG. 4, the swivel axes defined by bearing pins 35, 36 lie approximately in the middle of swiveling levers 8, 9, dividing them into a gripper arm facing outward and a counter arm facing inward. Between the gripper arms, an elastic means 11 in the form of a rubber cushion is inserted, forcing the gripper arms apart and thus causing the grippers 6 to tend to open. On the free ends of the gripper arms, recesses 38, 39 shaped approximately in a quarter circle are formed, adapted to the diameter of the bottles 1 in the area to be gripped. In the present embodiment, that would be the neck of the bottle 1 directly beneath a neck collar 7 or carrying ring provided on the head of the bottle. With gripper 6 closed, the two recesses 38, 39 extend more than 180 degrees around the bottle neck and are in contact with it with a certain force, so that the respective bottle 1 is held in a form fitting manner and also by frictional engagement. Thus, an absolutely reliable method of securing even bottles 1 that are at great risk of tilting in the sluice chambers 3 is achieved even at high conveyance speeds and high acceleration, without supporting the bottles in the bottom area.

The opening and closing of the grippers 6 at the desired locations on the path of revolution of the sluice wheel 4 are accomplished by a control device labeled as 5 on the whole; its design is described below. A control cam 10 is mounted rotatably between the counter arms of each pair of swiveling levers 8, 9. If this is standing essentially radially to the axis of rotation of the sluice wheel 4 (open position), the counter arms can approach one another to the maximum extent under the influence of the elastic means 11 and gripper 6 is opened. However, if the control cam 10 is essentially tangential to the axis of rotation of the sluice wheel 4 (closed position), as illustrated in FIG. 4, it causes the counter arms to be spread apart to the maximum extent, so the gripper arms with the recesses 38, 39 can be brought to the maximum proximity and gripper 6 is thus closed. Each control cam 10 is mounted on the lower end of a cam shaft 40 which is mounted rotatably in the sluice wheel 4 and parallel to the axis of rotation of the sluice wheel and projects slightly upward. A control lever 41 is mounted on the projecting end, so that the control cam 10 can be moved between its open position and its closed position, both of which are stabilized in a self-limiting manner.

The control levers 41 work together with four stationary bolt-like stops 13 through 16, which are mounted in the cover plate 51 covering the sluice wheel 4 on the top and projecting into the path of revolution of the control levers 41. The control levers 41 and the stops 13 through 16 are in the normal atmosphere, just like the annular space of the sluice wheel 4 between its spokes within the sluice chambers 3. The cam shafts 40 are therefore sealed airtight and therefore do not permit any gas exchange between the sluice chambers 3 and the environment.

The four star wheels 17 through 20 have the same basic design which is described below on the basis of the first star wheel 17. A horizontal star plate 43 is mounted on a vertical drive shaft 42 and has eight angle levers 44 distributed uniformly around the circumference and mounted so they can pivot about axes 45 arranged parallel to the drive shaft 42. A first cam roller 46 is mounted on the inside leg of each angle lever 44 and engages in a first grooved cam 47 which is arranged in a stationary mount below the star plate 43 and controls the swiveling motion of the angle levers 44 during a rotation of the star plate 43.

A sliding part 48 is mounted so that it is longitudinally displaceable on the outer leg of each angle lever 44 running approximately radially to the drive shaft 42. This sliding part has a second cam roller 49 which engages in a second grooved cam 50, which is arranged in a stationary mount above the star plate 43 and controls the radial movement of the sliding part 48. A clamp 24 is arranged on the end of each sliding part 48 which points radially outward and projects out of the angle lever 44. This clamp has swing arms 25, 26 arranged in the manner of scissors in the horizontal plane of rotation of the star wheel. These swing arms 25, 26 are mounted pivotally on the sliding part 48 by means of bearing pins 52, 53 and are put under tension in the closing direction by an elastic means 27 in the form of a tension spring. The legs of the swing arms 25, 26 pointing radially outward are bent in the shape of a quarter circle and are adapted to the diameter of the area of the bottles 1 to be gripped, encompassing more than 180 degrees. In this embodiment, this is the necked area between the top of the neck collar 7 and the lower edge of the thread on the head of the bottle. A bottle 1 can be gripped and secured reliably at this point without allowing the bottle to slip in the axial direction. Bottles 1 are also conveyed without any bottom support in the area of the star wheels 17 through 20, so that no fitting parts are necessary for different bottle heights, and damage to the bottle surface is prevented.

Although the grippers 6 are indirectly operated by their control device 5, the clamps 24 are operated directly by the bottles 1. To do so, the free ends of the swing arms 25, 26 are provided with chamfered control faces 28, 29 which press the swing arms 25, 26 apart, against the force of the elastic means 27, when a bottle 1 is pushed into the area between the swivel arms 25, 26 until the bottle 1 has snapped into place completely between the swing arms 25, 26. Conversely, the swing arms 25, 26 are opened again due to their shape in the form of a quarter circle when a bottle 1 is pulled out against the force of elastic means 27, until the bottle 1 has been snapped out completely.

As shown in FIG. 1, the first star wheel 17 is in the normal atmosphere outside the treatment space 2. It takes the bottles 1 from a feed conveyor 21 in the form of an air conveyor in whose end area the bottles 1 are held at a distance and cycled into the system by two parallel feed screws 54a, 54b driven in synchronization with the star wheel 17. By means of combined swiveling and radial movements of the sliding parts 48 controlled by the two grooved cams 47 and 50, the clamps 24 are snapped onto the bottles 1. Then the bottles 1 in the first star wheel 17 are slightly accelerated and brought to a greater distance by a mainly swiveling motion of sliding parts 48, and finally they are inserted in a controlled manner into the orifices of the sluice chambers 3 and inserted precisely into the opened grippers 6. On reaching the end position, the grippers 6 are closed by the stop 13 in the manner described above, after which the clamps 24 are pulled away from the bottles 1 by a predominantly radial movement and extracted from the sluice chambers 3. Since the grippers 6 are below the neck collar and the clamps 24 below the neck collar and the clamps 24 above the neck collar 7 act on the bottles 1, a problem-free transfer between these elements is thus possible.

The fourth star wheel 20, like the adjacent first star wheel 17, is in the normal atmosphere outside the treatment space 2. It takes the bottles 1 from sluice wheel 4 and transfers them to a discharge conveyor 22 in the form of an air conveyor. By appropriate control of the sliding parts 48 by means of grooved cams 47 and 50, the clamps 24 are snapped onto the bottles 1 which are still being held by the grippers 6 in the sluice chambers 3, whereupon the grippers 6 are opened by the stop 16 in the manner described above. Then the bottles 1 in the star wheel 20 are delayed and their distance is reduced until they are inserted into discharge conveyor 22 with a relatively small distance.

The second star wheel 18 and the third star wheel 19 are adjacent within the treatment space 2. The second star wheel 18 takes the bottles 1 from the grippers 6 of the sluice wheel 4 and transfers them at a reduced distance and reduced speed to the mandrels 32 of the conveyor 23. In doing so, the grippers 6 are opened by the stop 14. The third star wheel 19 takes the bottles 1 from the mandrels 32 of the conveyor 23 and transfers them at a greater distance and greater speed to the grippers 6 of the sluice wheel 4. The grippers 6 are closed here by the stop 15. The desired change of the distance and speed of the bottles 1 is also accomplished in the area of the star wheels 18 and 19, and likewise the adaptation between the different pitch and speed of the sluice wheel 4 on the one hand and the conveyor 23 on the other hand is accomplished through an appropriate design of the two grooved cams 47 and 50, just as is the predominant radial movement for snapping the bottles 1 in or out.

What is claimed is:

1. A device for introducing containers into a treatment space and removing containers from the treatment space, comprising in combination, at least one rotatable sluice wheel provided with sluice chambers, each sluice chamber including a side wall, top wall, and a bottom wall, each sluice chamber being open radially outwardly, said sluice wheel (4) being provided with grippers (6) which can be operated and which temporarily secure the containers in the sluice chambers (3).

2. Device according to claim 1, and wherein said grippers (6) can be operated directly by the containers (1).

3. Device according to claim 1, wherein said containers (1) are held suspended by said grippers (6) in said sluice chambers (3) without any bottom support.

4. Device according to claim 1, and wherein said grippers (6) can be operated indirectly by a control device.

5. Device according to claim 3, and wherein said containers are held suspended by said grippers (6) without coming in contact with the chamber walls.

6. Device according to claim 1, wherein said grippers (6) act on the peripheral area of said containers in a form fitting and frictionally engaged manner.

7. Device according to claim 6, wherein said grippers (6) act in an area beneath one of a carrying ring or neck collar (7) provided in the head area in the conveyance of PET bottles (1).

8. Device according to claim 6, wherein said grippers (6) act on at least one of the neck and head areas of said containers.

9. Device according to claim 1, wherein each said gripper (6) has at least two swiveling levers (8,9) arranged in the manner of gripper tongs, arranged essentially parallel to the plane of revolution of said sluice wheel (4) and projecting at least partially into the respective said sluice chamber (3).

10. Device according to claim 9, wherein said swiveling levers (8,9) of a said gripper (6) are mounted on a supporting plate (12) which is in turn detachably attached to said sluice wheel (4) in the area of the inside wall of the respective said sluice chamber (3).

11. Device according to claim 4, wherein a rotatable control cam (10) and an elastic means (11) are arranged between said swiveling levers (8,9) of each said gripper (6) and together they effect the opening and closing movement of said grippers (6).

12. Device according to claim 11, wherein said control cams (10) are opened and closed by stops (13 to 18) arranged in a stationary mount on the path of revolution of said sluice wheel (4), with said grippers (6) being stablized in their opened or closed position in the area of revolution between the stops (13 to 16) by one of said control cams (10) and said elastic means (11).

13. A device for introducing containers into a treatment space and removing containers from the treatment space, comprising in combination, at least one rotatable sluice wheel provided with sluice chambers which are open toward the outside for the containers arranged around the periphery, said sluice wheel (4) being provided with grippers (6) which can be operated and which temporarily secure the containers in the sluice chambers (3), wherein a single said sluice wheel (4) is provided, causing the containers (1) to be introduced into said treatment space (2) and to be removed from said treatment space (2), and at least four star wheels (7 through 20) that can be driven in synchronization with said sluice wheel but in the opposite direction of rotation and are arranged in the area of rotation of said single sluice wheel (4), with two said star wheels inside said treatment space (2) and two said star wheels outside said treatment space (2), for transferring the containers (1) at the proper pitch to said grippers (6) of said sluice wheel (4) and for receiving the containers (10) from said grippers (6) from said sluice wheel (4) at the proper pitch.

14. Device according to claim 13, wherein said star wheels (17,20) arranged outside said treatment space (2) work together not only with said sluice wheel (4) but also with a feed conveyor (21) for the unprocessed containers and a discharge conveyor (22) for the processed containers (1), while said two star wheels (18,19) arranged inside said treatment space (2) work together with a conveyor (23) which conveys the containers (1) through said treatment space (2).

15. Device according to claim 17, wherein each said clamp (24) has at least two swing arms (25,26) which are arranged in the manner of scissors and run essentially parallel to the plane of revolution of said sluice wheel (4) and enter temporarily and at least partially into said sluice chambers (3) of said sluice wheel.

16. Device according to claim 15, and an elastic means (11) provided between said swing arms (25,26) of each said clamp (24) and applying tension on said swing arms (25,26) in the closing direction, and with chamfered control surfaces (28,29) formed on the free end of said swing arms (25,26), for spreading said swing arms apart, against the force of said elastic means (11), when a container (1) is pressed into said clamps (24).

17. Device according to claim 13, wherein said star wheels (17 through 20) are provided with clamps (24) that can be operated and which act on a different peripheral area of the containers (1) than said grippers (6) of said sluice wheel (4).

18. Device according to claim 17, and wherein said clamps (24) can be operated directly by the containers (1).

19. Device according to claim 17, and wherein said clamps (24) can be operated indirectly by a control device.

20. Device according to claim 17, wherein said clamps (24) of at least one said star wheel (17 through 20) can be moved in a controlled manner with respect to its axis of rotation, so that the radial position, the mutual spacing, and the speed of said clamps (24) can be varied in a cyclic manner during one revolution of said star wheels (17 through 20).

21. Device according to claim 17, 13, 16, or 20, wherein said clamps (24) act by means of one of the carrying ring or the neck collar (7) provided on the head area in conveyance of PET bottles.

22. Device according to claim 20, wherein said at least one star wheel can be moved in a controlled manner essentially radially with respect to its axis of rotation.

23. Device according to claim 20, wherein said at least one star wheel can be moved in a controlled manner essentially tangentially with respect to its axis of rotation.

* * * * *